US008335930B2

(12) United States Patent
Johnson et al.

(10) Patent No.: US 8,335,930 B2
(45) Date of Patent: *Dec. 18, 2012

(54) ARCHITECTURE, SYSTEM, AND METHOD FOR OPERATING ON ENCRYPTED AND/OR HIDDEN INFORMATION

(76) Inventors: Richard C. Johnson, Sunnyvale, CA (US); Andrew Morgan, Los Gatos, CA (US); H. Peter Anvin, San Jose, CA (US); Linus Torvalds, Portland, OR (US)

( * ) Notice: Subject to any disclaimer, the term of this patent is extended or adjusted under 35 U.S.C. 154(b) by 6 days.

This patent is subject to a terminal disclaimer.

(21) Appl. No.: 12/567,519

(22) Filed: Sep. 25, 2009

(65) Prior Publication Data

US 2010/0017625 A1 Jan. 21, 2010

Related U.S. Application Data (63) Continuation of application No. 10/719,879, filed on Nov. 20, 2003, now Pat. No. 7,694,151.

(51) Int. Cl.
*G06F 12/14* (2006.01)

(52) U.S. Cl. ........ 713/190; 713/172; 713/189; 713/193; 711/147; 711/170; 711/173

(58) Field of Classification Search .................. 713/189, 713/190, 172, 193; 709/213–214, 203; 370/337; 382/100; 380/281; 712/220; 711/147, 170, 711/173
See application file for complete search history.

(56) References Cited

U.S. PATENT DOCUMENTS

| 4,486,827 A | 12/1984 | Shima et al. |
| 4,634,804 A | 1/1987 | Spalding |
| 4,634,807 A | 1/1987 | Chorley et al. |
| 4,674,089 A | 6/1987 | Poret et al. |
| 4,928,224 A | 5/1990 | Zulian |
| 4,941,176 A | 7/1990 | Matyas et al. |
| 5,034,980 A | 7/1991 | Kubota |
| 5,081,675 A | 1/1992 | Kittirutsunetorn |
| 5,305,244 A | 4/1994 | Newman et al. |
| 5,343,524 A | 8/1994 | Mu et al. |
| 5,463,535 A | 10/1995 | Vest |
| 5,475,829 A | 12/1995 | Thome |
| 5,511,123 A | 4/1996 | Adams |

(Continued)

FOREIGN PATENT DOCUMENTS

WO 03029939 4/2003

OTHER PUBLICATIONS

Notice of Allowance Dated Feb. 9, 2009; U.S. Appl. No. 10/719,879.

(Continued)

*Primary Examiner* — Thanhnga B Truong (57) ABSTRACT

An architecture, system and method for operating on encrypted and/or hidden information (e.g., code and/or data). The invention enables creators, owners and/or distributors of proprietary code to keep such code inaccessible to users and user-controlled software programs. A memory architecture includes first and second protected memory spaces, respectively storing operating system instructions and a decrypted version of the encrypted information. The first protected memory space may further store a table linking the locations of the encrypted and/or hidden, decrypted information with a decryption and/or authorization key. The system includes the memory architecture and a processor for executing instructions, and the method loads, stores and operates on the encrypted and/or hidden information according to the memory architecture functionality and/or constraints.

20 Claims, 6 Drawing Sheets

U.S. PATENT DOCUMENTS

| | | | |
|---|---|---|---|
| 5,511,206 | A | 4/1996 | Yasuda et al. |
| 5,530,753 | A | 6/1996 | Easter et al. |
| 5,563,950 | A | 10/1996 | Easter et al. |
| 5,596,741 | A | 1/1997 | Thome |
| 5,623,637 | A | 4/1997 | Jones et al. |
| 5,696,823 | A | 12/1997 | Blaze |
| 5,748,744 | A | 5/1998 | Levy et al. |
| 5,774,544 | A | 6/1998 | Lee et al. |
| 5,835,594 | A | 11/1998 | Albrecht et al. |
| 5,878,210 | A | 3/1999 | Kong |
| 5,896,522 | A | 4/1999 | Ward et al. |
| 5,933,497 | A | 8/1999 | Beetcher et al. |
| 5,991,399 | A | 11/1999 | Graunke et al. |
| 6,011,908 | A | 1/2000 | Wing et al. |
| 6,023,506 | A | 2/2000 | Ote et al. |
| 6,031,992 | A | 2/2000 | Cmelik et al. |
| 6,038,320 | A | 3/2000 | Miller |
| 6,044,157 | A | 3/2000 | Uesaka et al. |
| 6,061,449 | A | 5/2000 | Candelore et al. |
| 6,145,051 | A | 11/2000 | Estakhri et al. |
| 6,172,990 | B1 | 1/2001 | Deb et al. |
| 6,175,896 | B1 | 1/2001 | Bui |
| 6,199,152 | B1 | 3/2001 | Kelly et al. |
| 6,199,153 | B1 | 3/2001 | Razdan et al. |
| 6,249,782 | B1 | 6/2001 | Day et al. |
| 6,292,874 | B1 | 9/2001 | Barnett |
| 6,327,660 | B1 | 12/2001 | Patel |
| 6,363,486 | B1 | 3/2002 | Knapton, III |
| 6,401,208 | B2 | 6/2002 | Davis et al. |
| 6,408,376 | B1 | 6/2002 | Ganapathy et al. |
| 6,415,379 | B1 | 7/2002 | Keppel et al. |
| 6,453,233 | B1 | 9/2002 | Kato |
| 6,457,171 | B1 | 9/2002 | Mann et al. |
| 6,463,535 | B1 | 10/2002 | Drews |
| 6,507,904 | B1 | 1/2003 | Ellison et al. |
| 6,510,521 | B1 | 1/2003 | Albrecht et al. |
| 6,523,118 | B1 | 2/2003 | Buer |
| 6,581,137 | B1 | 6/2003 | Sandorfi |
| 6,587,949 | B1 | 7/2003 | Steinberg |
| 6,587,979 | B1 | 7/2003 | Kraus et al. |
| 6,598,165 | B1 | 7/2003 | Galasso |
| 6,598,166 | B1 | 7/2003 | Folmsbee |
| 6,633,963 | B1 | 10/2003 | Ellison et al. |
| 6,675,298 | B1 | 1/2004 | Folmsbee |
| 6,704,872 | B1 | 3/2004 | Okada |
| 6,802,006 | B1 | 10/2004 | Bodrov |
| 6,910,094 | B1 | 6/2005 | Eslinger et al. |
| 6,983,374 | B2 * | 1/2006 | Hashimoto et al. ........... 713/194 |
| 6,986,052 | B1 | 1/2006 | Mittal |
| 7,050,579 | B1 | 5/2006 | Koc et al. |
| 7,062,769 | B1 | 6/2006 | Ma et al. |
| 7,082,615 | B1 * | 7/2006 | Ellison et al. ................... 726/26 |
| 7,096,370 | B1 | 8/2006 | Klein |
| 7,185,192 | B1 | 2/2007 | Kahn |
| 7,191,344 | B2 | 3/2007 | Lin et al. |
| 7,225,333 | B2 | 5/2007 | Peinado et al. |
| 7,236,956 | B1 | 6/2007 | Ogg et al. |
| 7,360,097 | B2 | 4/2008 | Rothstein |
| 7,502,941 | B2 | 3/2009 | Michael et al. |
| 2001/0019559 | A1 | 9/2001 | Handler et al. |
| 2002/0002654 | A1 | 1/2002 | Tomohiro |
| 2002/0040436 | A1 | 4/2002 | Davis et al. |
| 2002/0071565 | A1 * | 6/2002 | Kurn et al. ..................... 380/281 |
| 2002/0107856 | A1 | 8/2002 | Scheussler et al. |
| 2002/0157015 | A1 | 10/2002 | Gilbert et al. |
| 2002/0165912 | A1 * | 11/2002 | Wenocur et al. .............. 709/203 |
| 2003/0021417 | A1 | 1/2003 | Vasic et al. |
| 2003/0041221 | A1 | 2/2003 | Okada |
| 2003/0041254 | A1 | 2/2003 | Challener et al. |
| 2003/0055061 | A1 | 3/2003 | Desai et al. |
| 2003/0056092 | A1 | 3/2003 | Edgett et al. |
| 2003/0061598 | A1 | 3/2003 | Karp et al. |
| 2003/0120745 | A1 | 6/2003 | Katagishi et al. |
| 2003/0126453 | A1 | 7/2003 | Glew et al. |
| 2003/0126454 | A1 | 7/2003 | Glew et al. |
| 2003/0142554 | A1 | 7/2003 | Green et al. |
| 2003/0172265 | A1 | 9/2003 | Vu et al. |
| 2003/0177373 | A1 | 9/2003 | Moyer et al. |
| 2003/0182569 | A1 | 9/2003 | Matsuzaki et al. |
| 2004/0005061 | A1 | 1/2004 | Buer et al. |
| 2004/0015694 | A1 | 1/2004 | DeTreville |
| 2004/0026036 | A1 | 2/2004 | Shimeno et al. |
| 2004/0039925 | A1 | 2/2004 | McMillan et al. |
| 2004/0098591 | A1 | 5/2004 | Fahrny |
| 2004/0107344 | A1 | 6/2004 | Minemura et al. |
| 2004/0243823 | A1 | 12/2004 | Moyer et al. |
| 2005/0025091 | A1 | 2/2005 | Patel et al. |
| 2005/0055311 | A1 | 3/2005 | Kosaki |
| 2005/0071651 | A1 | 3/2005 | Aguilar, Jr. et al. |
| 2005/0180752 | A1 | 8/2005 | Nakagawa |

OTHER PUBLICATIONS

Notice of Allowance Dated Sep. 29, 2008; U.S. Appl. No. 10/719,879.

Notice of Allowance Dated Oct. 30, 2009; U.S. Appl. No. 10/719,879.

Notice of Allowance Dated Jun. 1, 2009; U.S. Appl. No. 10/719,879.

Non-Final Office Action Dated Mar. 8, 2007; U.S. Appl. No. 10/719,879.

Non-Final Office Action Dated Apr. 14, 2008; U.S. Appl. No. 10/719,879.

Final Office Action Dated Sep. 27, 2007; U.S. Appl. No. 10/719,879.

Advisory Action Dated Oct. 20, 2009; U.S. Appl. No. 10/740,939.

Non-Final Office Action Dated Jan. 29, 2010; U.S. Appl. No. 10/740,939.

Notice of Allowance Dated Nov. 16, 2009; U.S. Appl. No. 10/672,796.

Advisory Action Dated May 14, 2009; U.S. Appl. No. 10/672,796.

Non-Final Office Action Dated Oct. 29, 2009; U.S. Appl. No. 10/334,921.

Non-Final Office Action Dated Jan. 6, 2010; U.S. Appl. No. 10/956,220.

Fordahl, M., "Transmeta Unveils Long-Awaited Next Generation Processor", Yahoo Finance, Oct. 14, 2003, pp. 1-2.

Microsoft, "Next-Generation Secure Computing Base: An Overview", Sep. 8, 2003, pp. 1-2. (MS1).

Microsoft, "Next-Generation Secure Computing Base: The Road to Security", Sep. 8, 2003, pp. 1-2. (MS2).

Microsoft, "Next-Generation Secure Computing Base: Product Information", Sep. 8, 2003, pp. 1-2. (MS3).

Microsoft, "Next-Generation Secure Computing Base: Four Key Features", Jun. 2003, pp. 1-3. (MS4).

Microsoft, "Next-Generation Secure Computing Base: Technical FAQ", Jul. 2003, pp. 1-9. (MS5).

Microsoft, "Press Pass Information for Journalists; Q & A: Microsoft Seeks Industry-Wide Collaboration for 'Palladium' Initiative", Jan. 25, 2003, pp. 1-4. (MS6).

Microsoft, "Press Pass Information for Journalists; The Journey to Trustworthy Computing: Microsoft Execs Report Firts-Year Progress", Jan. 15, 2003, pp. 1-7. (MS7).

Microsoft, "Press Pass Information for Journalists; Q & A: Delivering on Secure Computing", Apr. 14, 2003, pp. 1-6. (MS8).

Microsoft, "Press Pass Information for Journalists; At WINHEC, Microsoft Discusses Details of Next Generation Secure Computing Base", May 7, 2003, pp. 1-4. (MS9).

Transmeta, "Crusoe—The Technology—The Architecture—Code Morphing Software", Mar. 14, 2003, pp. 1-3. (TRANS1).

Transmeta, "Crusoe—The Technology—The Architecture—Longrun Power Management Technology", Mar. 14, 2003, pp. 1-3. (TRANS2).

Microsoft, "Hardware Platform for the Next-Generation Secure Computing Base", 2003, pp. 1-10. (MS10).

Microsoft, "NGSCB: Trusted Computing Base and Software Authetication", 2003, pp. 1-16. (MS11).

Microsoft, "Security Model for the Next-Generation Secure Computing Base", 2003, pp. 1-13. (MS12).

Klaiber, A., "The Technology Behind Crusoe Processors", Transmeta Corp. Manual, Jan. 2000, pp. 1-18. (TRANS3).

Final Office Action Dated Jun. 6, 2007; U.S. Appl. No. 10/334,921.

Final Office Action Dated Dec. 23, 2007; U.S. Appl. No. 10/334,921.

Non-Office Action Dated Feb. 13, 2009; U.S. Appl. No. 10/334,921.

Non-Office Action Dated Apr. 5, 2006; U.S. Appl. No. 10/334,921.
Non-Office Action Dated May 28, 2008; U.S. Appl. No. 10/334,921.
Non-Office Action Dated Oct. 6, 2006; U.S. Appl. No. 10/334,921.
Non-Office Action Dated Nov. 26, 2007; U.S. Appl. No. 10/334,921.
Non-Office Action Dated Jul. 7, 2009; U.S. Appl. No. 10/672,796.
Final Office Action Dated Aug. 3, 2009; U.S. Appl. No. 10/334,921.
Final Office Action Dated Aug. 14, 2009; U.S. Appl. No. 10/740,939.
Non-Office Action Dated Nov. 4, 2008; U.S. Appl. No. 10/672,796.
Final Office Action Dated Sep. 30, 2009; U.S. Appl. No. 10/956,220.
Final Office Action Dated Jul. 8, 2010; U.S. Appl. No. 10/956,220.
Non-Final Office Action Dated Apr. 28, 2010; U.S. Appl. No. 10/334,921.
Final Office Action; Mail Date Sep. 7, 2010; U.S. Appl. No. 10/334,921.
Final OA Dated Nov. 23, 2007; U.S. Appl. No. 10/740,939.
Final OA Dated Dec. 9, 2008; U.S. Appl. No. 10/740,939.
Non Final OA Dated Feb. 25, 2009; U.S. Appl. No. 10/740,939.
Non Final OA Dated May 2, 2007; U.S. Appl. No. 10/740,939.
Non Final OA Dated May 28, 2008; U.S. Appl. No. 10/740,939.
Non Final OA Dated Nov. 8, 2006; U.S. Appl. No. 10/740,939.
Final OA Dated Mar. 10, 2009; U.S. Appl. No. 10/672,796.
Final OA Dated Jul. 17, 2008; U.S. Appl. No. 10/672,796.
Final OA Dated Aug. 22, 2007; U.S. Appl. No. 10/672,796.
Non Final OA Dated Jan. 24, 2008; U.S. Appl. No. 10/672,796
Non Final OA Dated Feb. 26, 2007; U.S. Appl. No. 10/672,796.
Final OA Dated May 1, 2008; U.S. Appl. No. 10/956,220.
Non Final OA Dated Mar. 18, 2009; U.S. Appl. No. 10/956,220.
Non Final OA Dated Sep. 29, 2008; U.S. Appl. No. 10/956,220.
Non Final OA Dated Nov. 29, 2007; U.S. Appl. No. 10/956,220.

* cited by examiner

| SHA-1 | Encrypted? | Pointer |
|---|---|---|
| xxxxx | ✓ | aaaaa |
| yyyyy | ✓ | bbbbb |
| zzzzz | | |
| | | |
| | | |
| ⋮ | | ⋮ |

FIG. 5

ARCHITECTURE, SYSTEM, AND METHOD FOR OPERATING ON ENCRYPTED AND/OR HIDDEN INFORMATION

CROSS REFERENCE TO RELATED APPLICATIONS

This patent application is a continuation of and claims the benefit of copending U.S. patent application Ser. No. 10/719,879 entitled "Architecture, System, and Method for Operating on Encrypted and/or Hidden Information", by Richard Johnson et al., filed on Nov. 20, 2003, which is hereby incorporated by reference.

FIELD OF THE INVENTION

The present invention generally relates to the field of memory architectures, hardware and software, and methods for operating on, manipulating and/or processing encrypted and/or hidden information (e.g., software code and/or data). More specifically, embodiments of the present invention pertain to a processor memory architecture and method for interpreting, translating, performing operations on and/or executing hidden and/or encrypted code and/or data.

SUMMARY OF THE INVENTION

Embodiments of the present invention relate to a processor memory architecture, system and method for operating on encrypted and/or hidden information. (In general, the phrases "operating on" and/or "performing [an] operation[s] on" refer to standard and/or conventional methods of operating on, manipulating, executing and/or processing code or data, and the term "encrypted" refers to standard and/or conventional techniques and/or software programs for encrypting, ciphering, transmuting, translating, converting and/or scrambling information from a plain text or conventionally recognizable graphics or other common form into a form designed, adapted or configured to prevent, deter, hinder or inhibit interception, deciphering, reading comprehension and/or understanding by unauthorized parties.) In one embodiment of the present invention, the architecture enables storing encrypted information (e.g., software code and/or data) in unprotected (e.g., user-accessible) memory, while operating on an unencrypted form of this information only in protected (e.g., user-inaccessible) memory. In a further exemplary embodiment, the present invention provides a scheme for efficiently hiding proprietary information in a system, architecture and/or process that converts information from a non-proprietary format or ISA into a proprietary format or ISA.

The present invention advantageously allows manufacturers of peripheral devices, electronic systems, etc. (e.g., original equipment manufacturers, or OEMs), to extend their shipping systems with encrypted code (e.g., x86-compatible instructions), and/or extend their systems with hidden proprietary intellectual property (e.g., binary code, data, etc.). Some OEMs, for example, have x86-compatible software that has value as a trade secret. In some cases, the OEMs embed their algorithms in a custom chip (e.g., an ASIC, a ROM, flash memory, etc.). It is therefore desirable to keep proprietary code hidden from unprotected (e.g., x86) memory space.

Another advantage of the invention includes providing an ability to perform operations on hidden proprietary information, so that it is not visible to other non-proprietary (e.g., x86-compatible) processes in plain text form during normal system operations, and so that it does not appear in plain text form in unprotected or accessible (e.g., x86) memory/ memory space or on disk. These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer, processor, controller and/or memory. These descriptions and representations are the means generally used by those skilled in data processing arts to effectively convey the substance of their work to others skilled in the art. A procedure, logic block, process, etc., is herein, and is generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing," "operating," "computing," "calculating,"

"determining," "displaying" or the like, refer to the action and processes of a computer system, or similar processing device (e.g., an electrical, optical, or quantum computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention concerns an architecture, method and system for manipulating, hiding, executing and/or operating on hidden and/or encrypted information (e.g., code and/or data). In one aspect of the invention, the architecture comprises an unprotected memory space configured to store encrypted information, a first protected memory space configured to store at least part of a set of operating system instructions, and a second protected memory space configured to store a plain text (decrypted) version of the encrypted information, wherein the operating system instructions in the first protected memory space operate on the decrypted information in the second protected memory space.

In another aspect of the invention, the system comprises a processor and the above memory architecture, where the processor is configured to execute the operating system instructions.

In a further aspect of the invention, the method comprises the steps of (a) transferring encrypted and/or hidden information to a first protected memory address inaccessible to a user-accessible software program, but accessible to an operating system instruction set; (b) decrypting the encrypted information to form a decrypted version thereof; and (c) storing the first protected memory address in a second protected memory address inaccessible to a user-accessible software program, but accessible to an operating system instruction set, where the second protected memory address is linked to an original location of the encrypted and/or hidden information.

The invention further relates to hardware and/or software implementations of the present architecture, method and system. The invention, in its various aspects, will be explained in greater detail below with regard to preferred embodiments.

Figure 1:
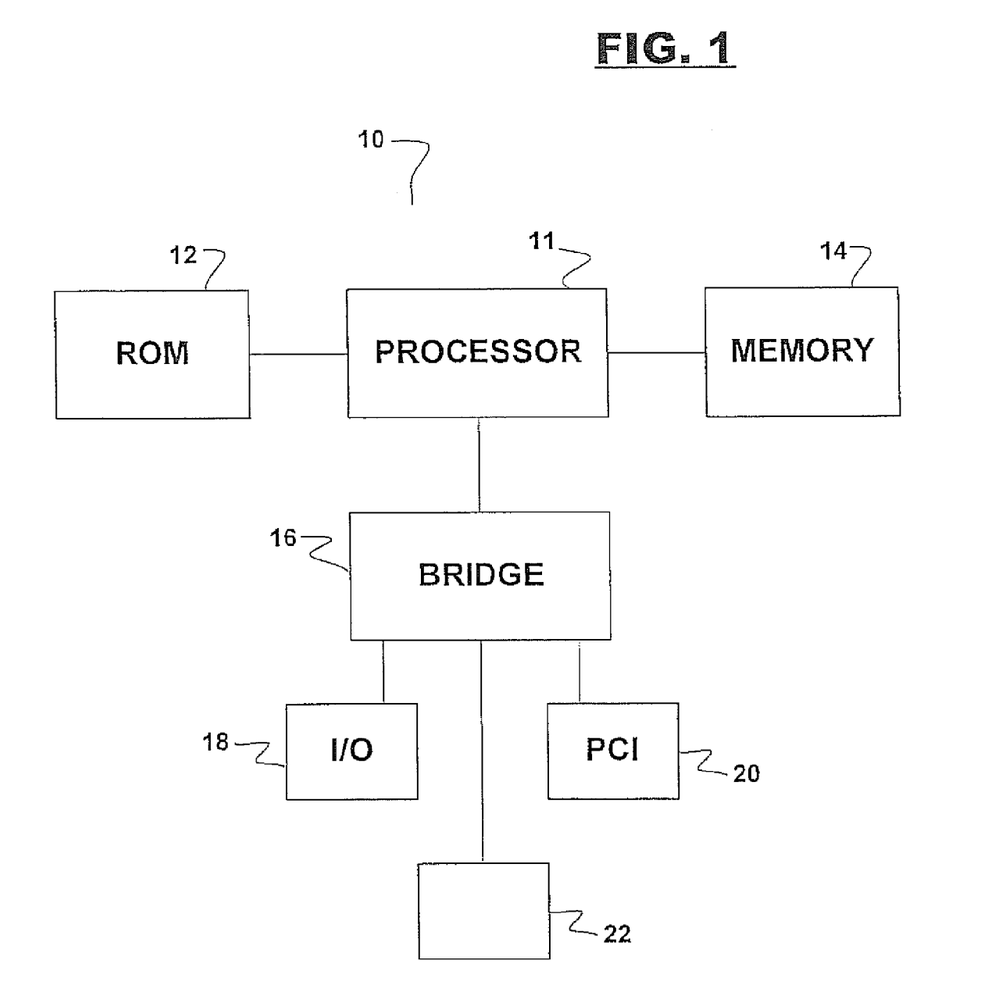
FIG. 1 is a diagram showing an exemplary architecture and/or system implementing the present invention.

FIG. 1 shows an exemplary hardware architecture 10 in which the present invention may be implemented. Processor 11 (which may include a microprocessor, microcontroller, ASIC, FPGA, CPLD, system on a chip or other logic circuit, integrated circuit or combination thereof) is generally configured to execute conventional software instructions, operate on data stored in memory 14, or perform other logic operations or processes consistent with such circuits and/or devices. Memory 14 is communicatively coupled to processor 11, and is configured to store code (e.g., software program instructions) and/or data. Memory 14 may include random access memory (e.g., DRAM and/or SRAM), cache memory (which may be, e.g., L1 and/or L2), an optical data storage medium (such as a CD-ROM), a floppy disk, a conventional hard drive (which may be, e.g., a personal computer hard drive, a USB-compatible or other external hard disk drive, etc.), a detachable electronically erasable and programmable memory (such as a memory stick), etc. ROM 12, which may comprise one or more discrete memory devices, is communicatively coupled to processor 11, and is configured to store information in a generally non-erasable form (e.g., a BIOS). ROM 12, which preferably comprises a boot memory and preferably is generally inaccessible to the user, may include an EPROM, EEPROM, flash memory, etc. More preferably, ROM 12 comprises one or more conventional flash ROMs.

Still referring to FIG. 1, bridge 16 conveys instructions and/or information from processor 11, memory 14 and/or ROM 12 to internal and/or external devices such as I/O device 18, PCI device 20 and/or other peripheral device 22. In a preferred embodiment, bridge 16 is a conventional south bridge apparatus, IC, device or circuit. Peripheral device 22 may comprise a storage medium, a printer, a display monitor, a Universal Serial Bus (USB) peripheral device, etc. The system and/or architecture of FIG. 1 may comprise one or more I/O device 18 and/or one or more peripheral computer interface (PCI) device 20. There may be any number of peripheral devices 22 (which is optional) that is supportable by the system and/or architecture. Further examples of suitable systems and/or architectures to which the present invention is generally applicable are described in, e.g., U.S. Pat. Nos. 6,031,992, 6,011,908, 6,175,896, 6,199,152, 6,327,660, 6,401,208, 6,408,376 and 6,415,379, and in "The Technology Behind CRUSOE™ Processors," by A. Klaiber, Transmeta Corp. (January 2000) (available from the World Wide Web at www.transmeta.com), the relevant portions of which are each hereby incorporated by reference.

In certain preferred embodiments, the processor 11 executes software that translates and/or interprets instructions and/or code (hereinafter, "code") from a first conventional and/or non-proprietary instruction set architecture ("ISA") or format (e.g., x86 or CISC, RISC, SPARC, etc.) into a second, optionally proprietary, ISA or format (e.g., a Very Long Instruction Word format employed in certain CRUSOE® processors, commercially available from Transmeta Corporation, Santa Clara, Calif.). One conventional tool for such instruction interpretation and translation is CODE MORPHING™ software, or CMS™, tool and/or architecture (also available from Transmeta Corporation, Santa Clara, Calif. on certain of its CRUSOE® processors). Consequently, a further aspect of the invention relates to a software tool configured to manage memory resources in system/architecture 10, preferably one having an ability to programmably allocate and/or partition memory resources to various different functions (e.g., unprotected/accessible memory, protected memory in which information is hidden to user-accessible programs and/or object code, private memory as described herein, etc.) within memory space 100 in system/architecture 10, such as that in the CMS tool. Thus, the size of each of the various memories within memory space 100 may be programmable and may be changed according to changes in design or performance criteria. The present invention provides particular advantage in systems and/or architectures employing instruction and/or code interpretation and/or translation and/or memory management.

Figure 2:
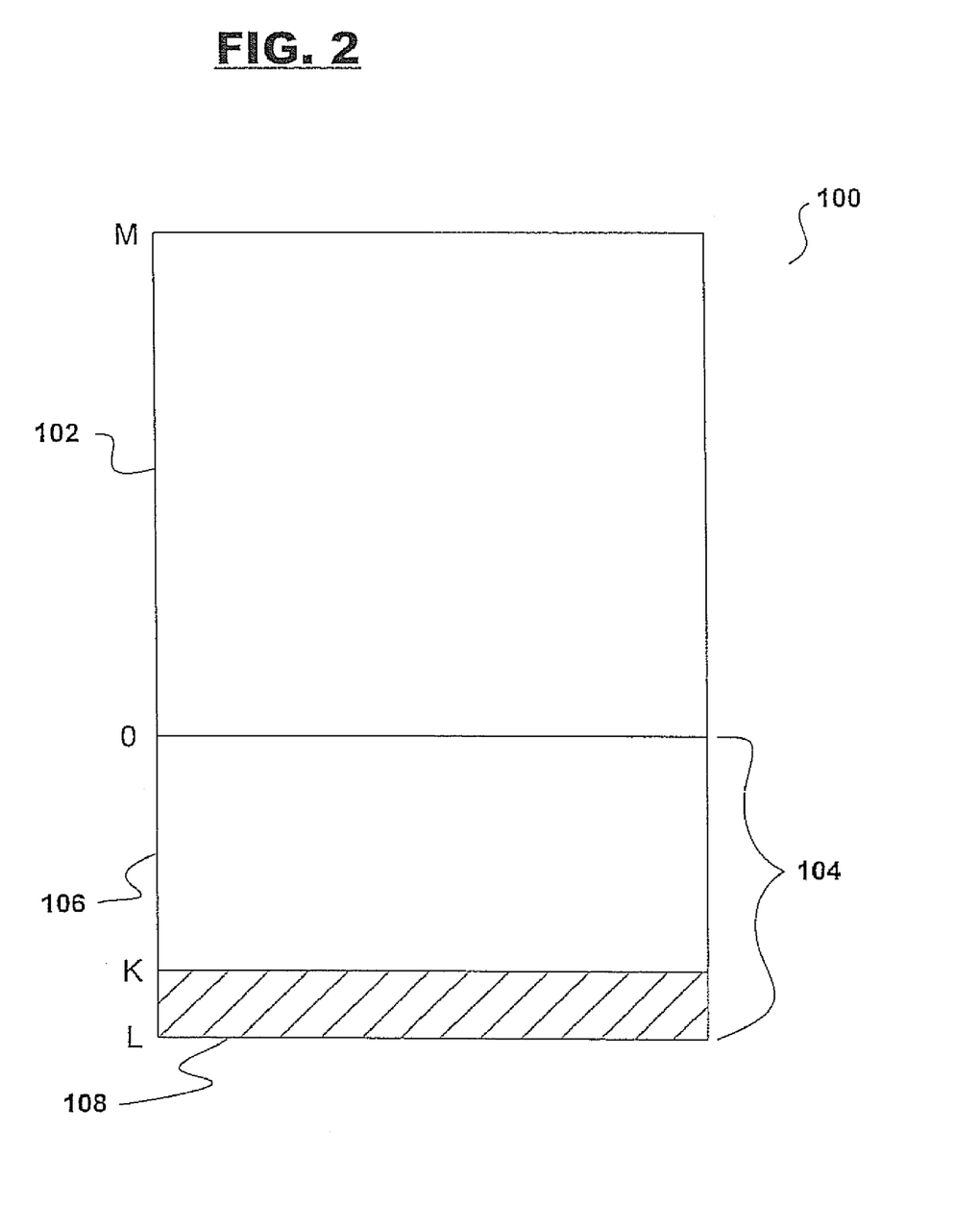
FIG. 2 is a diagram showing an exemplary memory architecture for the system of FIG. 1.

FIG. 2 shows a memory architecture (or memory space allocation diagram) 100 suitable for use with the present invention. Memory space 100 may comprise all or part of memory 14 and/or ROM 12, but preferably, comprises part of memory 14. Accessible and/or unprotected memory 102 begins at address 0 and continues through address M kb (where M may be any positive integer value; e.g., from 1 to $2^n$, n being any positive integer, preferably $\geq 10$, more preferably $\geq 13$, even more preferably $\geq 15$). Inaccessible and/or protected memory 104 begins at address L kb and continues through address 0 (where L may be any negative integer value; e.g., from 1 to $-2^x$, x being any positive integer, preferably $\geq 10$, more preferably $\geq 12$, even more preferably $\geq 13$). Alternatively, protected memory 104 may be in a second memory address space, beginning at address 0 and continuing through address L kb (where L may be any positive integer value; e.g., from 1 to $2^x$, where x is as described above, and in which case unprotected memory 102 begins at address L+1 and continues through address L+M kb). Optionally, when the system or architecture employs instruction and/or code interpretation and/or translation, part of protected memory 104 may comprise an interpretation cache 106 for storing code and/or instructions for interpreting and, optionally, (re)compiling ISA code and storing interpreted and/or (re)compiled ISA code. In such a case, the remainder 108 of protected memory may comprise a translation cache, beginning at address K kb and continuing through address L kb (where K may be any negative integer value; e.g., from 1 to $-2^y$, y being any positive integer, preferably $\geq 9$, more preferably $\geq 10$).

In general, encrypted and or proprietary information may be stored in any part of memory 100. Preferably, however, proprietary information is stored in unencrypted form only in protected memory 104. Also, preferably, encrypted information in unprotected memory 102 is unencrypted, then stored in protected memory 104 prior to execution and/or operation on it by processor 11.

In some cases, it is more desirable to hide proprietary data than to hide the code that operates on such data. The present invention advantageously provides a mechanism for hiding proprietary data in protected memory (e.g., memory the addresses of which are protected [preferably by hardware] from user and/or software access), so that it is not visible either (a) in plain text or recognizable form from unprotected memory, or (b) to non-proprietary, conventional and/or untranslated software-controlled processes. The proprietary data may be stored in a protected buffer (e.g., register bank having an address requiring authorization or authentication before access thereto is allowed), and it may be accessed through instructions to load the proprietary information from (or store it to) a form of protected memory, identified herein as "private" memory. (In the present application, "memory" also refers to addressable memory space, regardless of the physical form such memory space takes.) In general, only authorized processes may execute instructions to load or store information (preferably encrypted and/or proprietary) in or from private memory. In one embodiment, an unauthorized process (e.g., instruction execution) will perform a "no operation," or NOP, instruction in place of any unauthorized load or store operation that attempts to access private memory.

Figure 3:
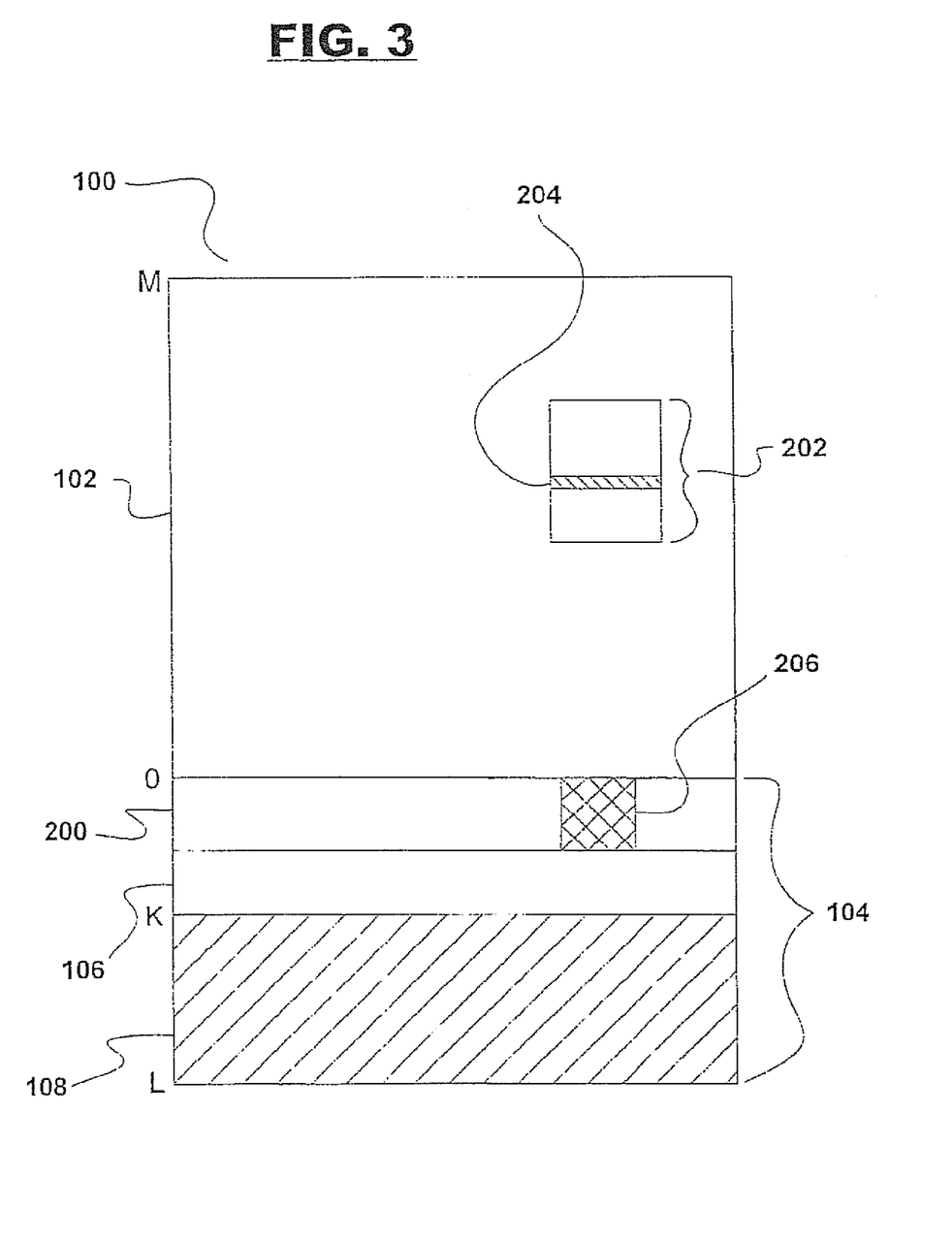
FIG. 3 is a diagram showing a further exemplary memory architecture implementing the present invention.

FIG. 3 shows an exemplary implementation of the present invention in memory 100. Within protected memory 104 is private memory 200. Private memory 200 is configured to store unencrypted and/or plain text information (e.g., code and/or data) in a manner that protects or hides it from being observable in user-accessible or unprotected memory. Preferably, the system and/or architecture 10 further includes a table configured to associate encrypted information (particularly encrypted code) with the corresponding unencrypted information stored in protected memory 104 or private memory 200. In one embodiment, the table includes (1) an authorization key or message digest which corresponds to and/or is generated from information (code and/or data) in the encrypted code and/or data stored in unprotected memory, and (2) a pointer to the address in protected, private memory 206 where the unencrypted information is stored (see, e.g., FIG. 4).

Referring back to FIG. 3, encrypted information may be decrypted and stored in protected memory 104 (and preferably private memory 200) shortly after system boot-up. When operating on encrypted data using, for example, authorized instructions to load and/or store the data (e.g., sometimes referred to "load x" and/or "store x," or LDX and/or STX), the table holds a list of pages that are authorized to execute such instructions, and therefore, that are authorized to access the corresponding plaintext copy of the encrypted data. Thus, each time the processor attempts to execute an instruction requiring authorization (e.g., load and/or store data that has been encrypted), the system checks the table for authorization. However, in the case of executing encrypted code, the table is accessed (and thus authorization is sought and/or confirmed) whenever execution enters a new page (of the code).

In one embodiment, the invention further includes new "load x" and "store x" instructions that proved authorized access to encrypted and/or proprietary information. These "load x" and "store x" instructions read from and write to a plaintext copy of proprietary (or otherwise decrypted) information stored in a protected memory buffer. "Load x" and "store x" instructions can execute only in an authorized process; unauthorized execution will perform a "no operation," or NOP, instruction in place of an unauthorized "load x" or "store x" operation that attempts to access protected memory where the plaintext copy is stored (preferably, in private memory 200).

Figure 4:
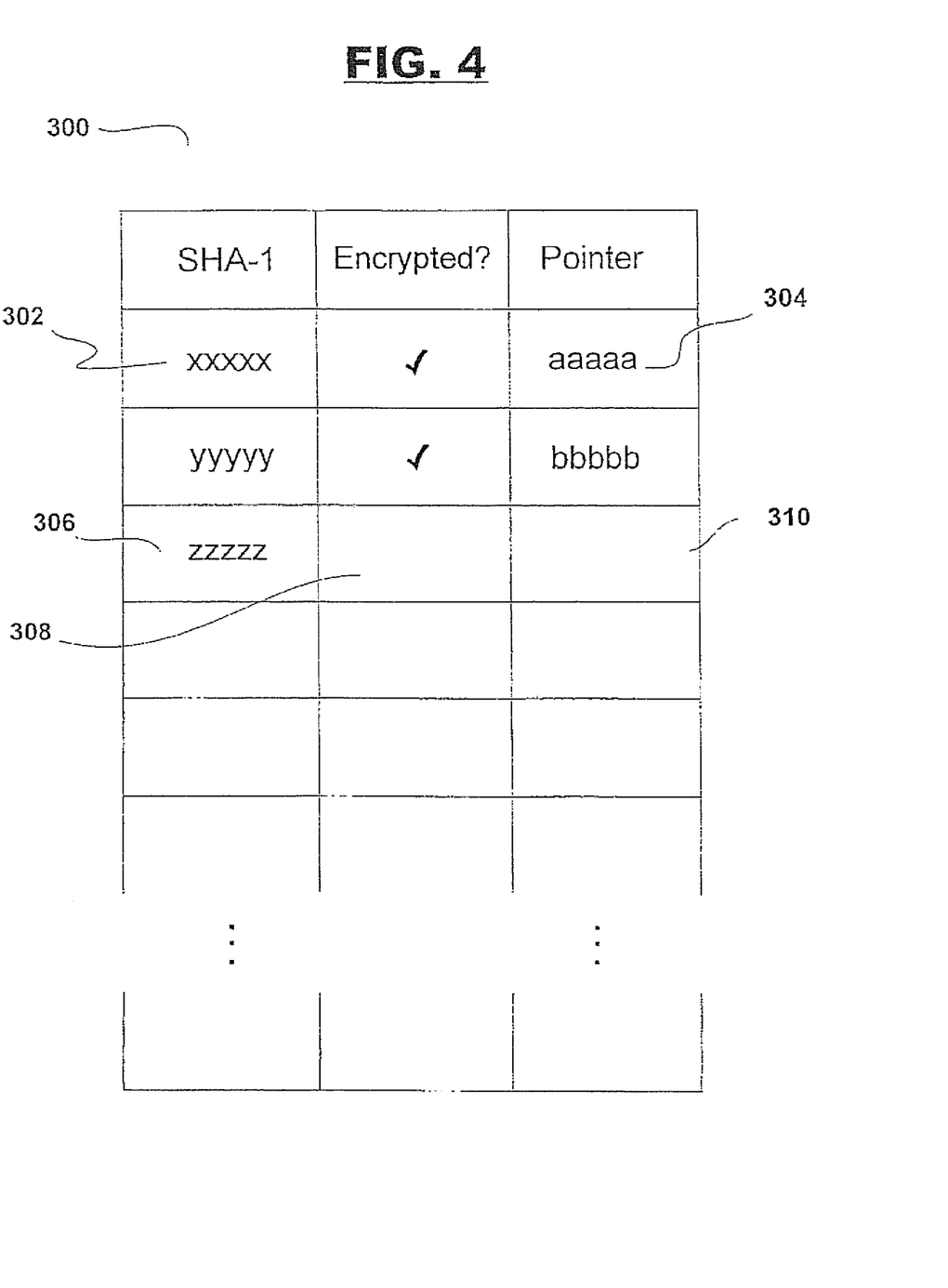
FIG. 4 is an exemplary table for correlating identifiers (e.g., keys) with memory addresses of corresponding pages in the memory of FIG. 2.

Referring to both FIGS. 3 and 4, a further exemplary implementation of how the present invention can be used will be illustrated using encrypted, proprietary data as an example. However, as explained above, the present invention is equally applicable to proprietary and/or encrypted code and/or encrypted, non-proprietary data as well.

As shown in FIG. 4, an authorization key 302 may be selected and stored (preferably by the owner, controller or creator of the proprietary data) in a configuration table 300. The encrypted information (including the authorization key or corresponding message digest from the encrypted page) is preferably stored in unprotected memory 102 (preferably on a hard disk) by the system/architecture 10 manufacturer or user. (Hereinafter, the phrases "authorization key" and "message digest" are used somewhat interchangeably, except where the context of such use clearly distinguishes between the two phrases.) The configuration table 300 (or "trusted page" list of which table 300 is at least a part) may also be stored by the system/architecture 10 manufacturer or user in any of memory 14, ROM 12 or memory 100, but is preferably stored in a protected memory on ROM 12, by the system/architecture manufacturer. The data may be encrypted and unencrypted using any appropriate proprietary or conventional encryption/decryption program (such as DES, AES or PGP, but preferably DES) and the decryption (or "root") key. Where the message digest field is used as an authorization key (e.g., message digest 306 in table 300) to verify that a page of code is authorized to access encrypted data, the corresponding indicator field 308 and pointer field 310 are generally left unused because the operating system instructions (or other set of instructions configured to operate on data and/or code in protected memory, such as translation and/or interpretation code) simply verifies that "load x" (e.g., LDX) and/or "store x" (e.g., STX) operations are executing from one or more pages whose message digest(s) appear in table 300.

At the time of manufacture, an OEM generally encrypts the table 300 and stores it in a ROM (e.g., ROM 12 in FIG. 1) along with a decryption key and, e.g., a message digest or authorization key. The ROM is generally protected from access by end users, but not from access by the system designer and/or manufacturer.

After booting the system, an unprotected program (e.g., including a driver in unprotected memory 102) loads the encrypted data file 202 (or page[s] thereof) into protected memory 106 using an MSR interface (i.e., standard "Model Specific Registers," which may be used to extend an x86 architecture as is known in the art). Alternatively, instructions may be added to the operating system for performing this function, or one or more virtual devices may be added to the north bridge of system/architecture 10 (not shown) to perform this function.

Operating system software (e.g., for interpreting and/or translating information in unprotected memory, such as the CMS tool from Transmeta Corp.) checks the encrypted data to determine whether the message digest matches a message digest in the configuration table(s). If so, decryption software (which may be stored in unprotected or protected memory) decrypts the data using the decryption key stored in protected memory or on ROM by the OEM, and stores the plain text version in a buffer 206 allocated in private memory 200. Alternatively, the configuration table and/or trusted page list can be encrypted, stored on disk and brought into protected memory 104 after boot in the same manner described above for protected proprietary data. Authorized "load x" (e.g., LDX) and/or "store x" (e.g., STX) instructions (e.g., instruction 204 stored within file 202) access the buffer 206. Unauthorized LDX/STX instructions (i.e., an LDX/STX instruction in a file for which no key is present in a configuration table and/or trusted page list) perform NOPs instead of LDX/STX instructions.

In the simplest implementation, pages of programs containing authorized "load x" and/or "store x" instructions are authorized using a one-way hash (e.g., SHA-1 hashing). However, any unique identifier (within statistical significance) for the page, or even the entire program, may be used to authorize the page and/or program. Although the term "page" is used extensively herein to refer to a unit of memory of known size and configuration (e.g., depth and width), any similar term or configuration of memory may be applied to the present invention (e.g., block, number of bytes, packet, etc.). Code from one (or more, but preferably just one page) of such program pages is compiled, hashed and linked so that it loads at a fixed or known address in private memory 200. In one example, the page size is 4 kb, and the SHA-1 hash is about 160 bits long. However, within design criteria and/or constraints (e.g., the size and allocations of ROM memory), the invention is implementable with any memory unit or page size (but preferably $\geq 1$ kb and $\leq 1$ Mb) and any hash length that is sufficiently long to render it infeasible for another page to hash to the same value (and that is, e.g., $\geq 16$ bits and $\leq 100$ bytes long).

Alternatively, one may hash the first X bytes of an encrypted page (where X is a number of from 1 to $2^q$, preferably from $2^m$ to $2^n$, where q is an integer of from 5 to 10, m is an integer of from 2 to 4, and n is an integer of from 4 to 8) and determine whether that partial hash matches the corresponding portion of any of the keys in table 300 (in which case table 300 should also include a field for storing partial page hashes). If so, the hash for the entire encrypted page may be taken, and key matching performed as described above. This technique may reduce the overhead associated with full hashing of entire pages of encrypted information. Also, the hash for the entire proprietary program may be taken and stored to authorize the entire program, but one may trade off higher key-granularity (preferable where only a certain subset of pages of the program are used extensively) for fewer hashing and decrypting operations. Furthermore, one may take a hash for one or more pages of proprietary information within a proprietary program may function as a key for the entire program, but this is less preferred due to the potential for uncertainty among various versions of the same program.

Preferably, the pages containing LDX/STX operations are read-only, are not modified at load time, and are stored in unprotected memory at a fixed or known address. However, it is certainly within the scope of the invention to encompass applications including self-modifying code, updated code and/or code that may be moved or transferred from a first address to a second (or further) address according to application criteria.

In this embodiment, the pages to be authorized have their SHA-1 hash recorded at manufacturing. The SHA-1 hashes are saved on disk and encrypted using the key. At boot, the SHA-1 hashes are passed to decrypting, interpreting and/or translating software, decrypted, and stored in protected memory (preferably in ROM 12). The operating system (e.g., interpreter/translator) software verifies that any instance of LDX/STX is on a page the SHA-1 hash of which appears in the authorized page list in protected memory.

To hide proprietary code, the present invention is adapted to support direct execution of encrypted code from unprotected memory space. Code pages to be stored in unprotected memory space 102 will be encrypted using an appropriate key at the time of manufacturing. As described above, in one embodiment, encrypted pages will be identified by a list of their SHA-1 hashes (see FIG. 4). Alternatively or additionally, a list may be created and stored in memory 14 (preferably ROM or a hard drive within memory 14) that identifies pages in unprotected memory 102 that are authorized to execute a load and/or store operation in protected memory 106 and/or private memory 200. These hashes can be encrypted and saved on disk at time of system/architecture 10 manufacturing, and in such a case, they will be loaded into protected memory after boot.

During execution, when processor 11 fetches an encrypted page (or system 10 "enters" the page) from unprotected memory 102, its SHA-1 hash will be looked up in table 300. If the hash 302 is found, but the decrypted information pointer 304 (i.e.; the address/location in protected and/or private memory where the decrypted information can be found) is vacant, the page is decrypted, its plain text version is stored in protected and/or private memory, and the SHA-1 entry is marked present and associated with the plain text page at its address in protected memory. Execution (e.g., interpretation, translation and/or other operations) continues on the plain text copy stored in protected and/or private memory. (In a preferred embodiment, decrypted information is stored in private memory 200, then the operating system interprets and translates the decrypted information into a proprietary format or ISA and stores the interpreted and translated information in translation cache 108, before the information is further operated on.) Consequently, two sets of interpreting software may be necessary (one for interpreting code in unprotected memory, the other for interpreting code in protected memory).

As is known in the art and as described above, one may do partial or full hashing. For example, one may hash the first X bytes of code and/or data in an encrypted page in unprotected memory 102 (where X is as described above; in one embodiment, X is 16). If the partial hash matches a partial-hash entry in table 300, the remainder of the encrypted page can be fully hashed, and if the full hash matches a full-hash entry in table 300, the encrypted page can be loaded into protected memory, decrypted, and operated on. Partial hashing may require an appropriate set of software tools for implementation; e.g., in addition to the above, a tool that prohibits instructions that cross page boundaries (e.g., to avoid mixing encrypted and plain text code or data), etc.

Alternatively, one may simply store the hash of the encrypted page in a known location or encrypt a portion of a page (e.g., substantially all of the page except for its [unencrypted] hash), rather than take the hash of each page of encrypted information each time it is accessed. For example, the SHA-1 hash for a 4 Kbytes page is 20 bytes long. If the first 20 bytes of the page is its SHA-1 hash, and the remaining (4K−20) bytes are encrypted, then the hashing operation can be avoided when the page is accessed. One may simply try to match the first 20 bytes of a 4K page with entries in the table. If no match is found, the page does not contain encrypted code or data. If a match is found, to avoid potential errors such as false positives, one should still hash the remaining (4K−20) bytes and verify that the hash matches the first 20 bytes in the pace. This alternative embodiment may also require appropriate software rules, such as a rule prohibiting instructions across page boundaries.

Advantageously, however, operating system software (and preferably, translation and/or interpretation code) rules further include, when operating on encrypted and/or hidden code, (i) disabling instruction breakpoints and (ii) disabling execution of single steps. These rules render single stepping through encrypted information impossible, thereby further inhibiting software (and certain types of hardware) accesses to the encrypted information.

In addition, one may employ a page locating mechanism conceptually similar to the hashing scheme described above. When an encrypted pace authorized to perform LDX/STX instructions is accessed (e.g., in the TLB miss path or other point in the system memory hierarchy when a page access is performed) for the first time after boot up, rather than hashing the encrypted page, the encrypted page is simply decrypted and stored in private memory 200. The address of the decrypted (plain text) page in private memory 200 is stored in the "Pointer" column of table 300, and is linked to the address of the encrypted page in unprotected memory 102 stored in the "SHA-1" column of table 300, so that the operating system of system/architecture 10 can locate and operate on the plain text code and/or data in protected memory. (an such an embodiment, the "SHA-1" column would be appropriately relabeled "Encrypted Information Address," "Disk Address," etc.) Thereafter, in further accesses of the authorized encrypted page, the operating system looks up the addressees) in table 300, then operates directly on the decrypted/hidden information stored in protected memory identified in table 300. This embodiment retains the essence of the other embodiments described above, in which a unique identifier links, or is otherwise associated with, both encrypted information in unprotected memory and a location or address in protected memory for the corresponding decrypted and/or hidden information.

The present invention also enables combining hidden code and data, so that hidden data can only be accessed from encrypted pages.

Constraints on the present scheme include a maximum size of encrypted pages that must fit in protected memory 106. A typical upper-bound on this size is 16 MB, but of course, this size can be adjusted or even programmed, according to design. Furthermore, encrypted pages should be read-only and should not be modified during load operations. Furthermore, encrypted code and data should always load at the same linear address. In addition, encrypted pages of code preferably should not contain data, since there may be inefficiencies in existing software tools to redirect a load operation from an encrypted page to the plain text copy stored in protected memory.

Figure 5:
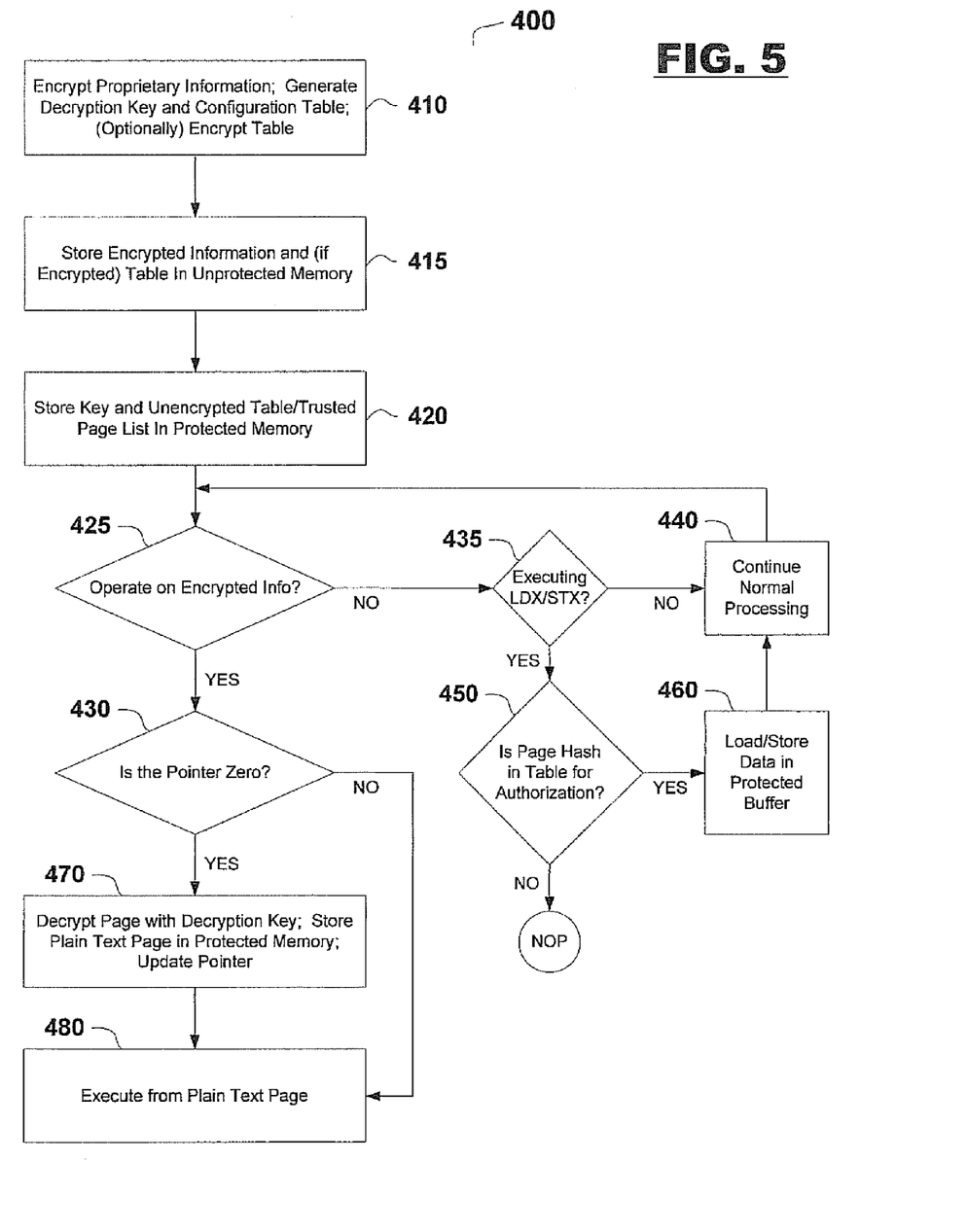
FIG. 5 is a flow chart describing an exemplary process in accordance with the present invention for decrypting and operating on encrypted, proprietary information.

FIG. 5 is a flow chart showing exemplary steps in the process/method of the present invention. Process 400 comprises a number of steps 410-480. Initially, in step 410, the proprietary information is encrypted, and a decryption key and configuration table are generated. Optionally, and as described above, the configuration table may also be encrypted, moved and stored in the same manner as for encrypted information. Typically, step 410 is performed by the manufacturer, owner, creator and/or distributor of the proprietary information, who typically transmits the encrypted proprietary information, decryption key and configuration table to the manufacturer, designer, creator and/or distributor of system/architecture 10 for inclusion therein.

Including and/or incorporating the encrypted proprietary information, the encrypted or unencrypted configuration table/trusted page list, and decryption key in system/architecture 10 generally comprise steps 415 and 420 of FIG. 5. In step 415, the encrypted information and, if encrypted, the configuration table is stored in unprotected (accessible) memory 102. In step 420, the decryption key and, if unencrypted, the configuration table are stored in protected (inaccessible) memory 106 or private memory 200, but preferably in a ROM (more preferably a flash memory ROM, so that it can be deleted, replaced or overwritten if desired or necessary). At boot up, all pointers in the table or list are designated zero or origin, and then are replaced with information designating the actual address or location in protected or private memory (preferably private memory) where the plain text information is found after decryption.

In step 425, system/architecture 10 determines whether it is to operate on the encrypted information stored in unprotected memory 102. If not, the operating system in system/architecture 10 in step 435 determines whether loading and/or storing instructions are being executed. If such instructions are not being executed (and/or are not in an instruction queue for execution), the architecture/system 10 and operating system continue normal processing in step 440, as encrypted information is not being operated on.

However, if load x and/or store x instructions are being executed (and/or are in a queue to be executed), the operating system then calculates the page hash for the encrypted page associated with the loading and/or storing instructions being executed. In step 450, that hash is compared with the hashes in a corresponding configuration table that stores authorized hashes for that encrypted information. If the calculated hash matches an authorized hash, in step 460, the load x/store x instruction is allowed to execute and to access the plaintext version of the encrypted data stored (in one embodiment) in protected buffer 206, and the system/architecture 10 and operating system continue normal processing in step 440. If the calculated hash does not match any authorized hash, the operating system executes a "no operation" instruction, effectively aborting the load/store instructions.

Referring back to step 425 in FIG. 5, if the operating system determines that it is to operate on encrypted information, then in step 430, system/architecture 10 determines whether table 300 has stored therein a corresponding non-zero pointer (e.g., an address location in protected memory 104 and/or private memory 200 where the decrypted proprietary information corresponding to the encrypted information can be found). If such an "all zeros" pointer is found in table 300, the decrypted proprietary information corresponding to the encrypted information is not yet stored in protected memory. Thus, in step 470, the operating system decrypts the encrypted proprietary information using conventional software tools for such operations. Generally, the information is decrypted using the decryption key stored in the manufacturer-supplied ROM (or, in an alternative embodiment, as a page-specific decryption key in table 300), the plain text or decrypted information is stored in protected and/or private memory, and the new, non-zero pointer that corresponds to the location of the decrypted information is also stored in table 300, prior to other operating system operations (e.g., interpretation and translation) on the plain text page in step 480. Referring back to step 430, if the pointer has a non-zero value, the decrypted proprietary information corresponding to the encrypted information is in protected memory, and the operating system can execute from the corresponding plain text page.

Decryption could happen as early as when encrypted information pages are first loaded into unprotected memory (e.g., by keeping a shadow plain text copy in protected and/or private memory), or as late as when bytes are fetched by an appropriate operating system tool (such as an interpreter or [pre]fetcher; this may be considered to be an "on demand" scheme). In one implementation, decryption is performed on demand when pages are first accessed by an operating system tool, instruction and/or operation (and in a preferred embodiment, the tool is an interpreter), and a cache of the corresponding plain text pages is kept in protected memory.

Although specific steps are disclosed in process 400 of FIG. 5, such steps are exemplary. That is, the present invention is well suited to use with various other steps or variations of the steps recited in process 400. Additionally, for purposes of clarity and brevity, the discussion is directed at times to specific examples. The present invention (e.g., system/architecture 10 and/or process 400), however, are not limited solely to use with a particular device (e.g. a CPU or microprocessor) or with particular code (e.g., an x86 instruction set). Instead, the present invention is well suited to use with other types of hardware and software in which it may be desirable to accomplish a multitude of tasks as part of an overall process directed at parsing hidden code.

Figure 6:
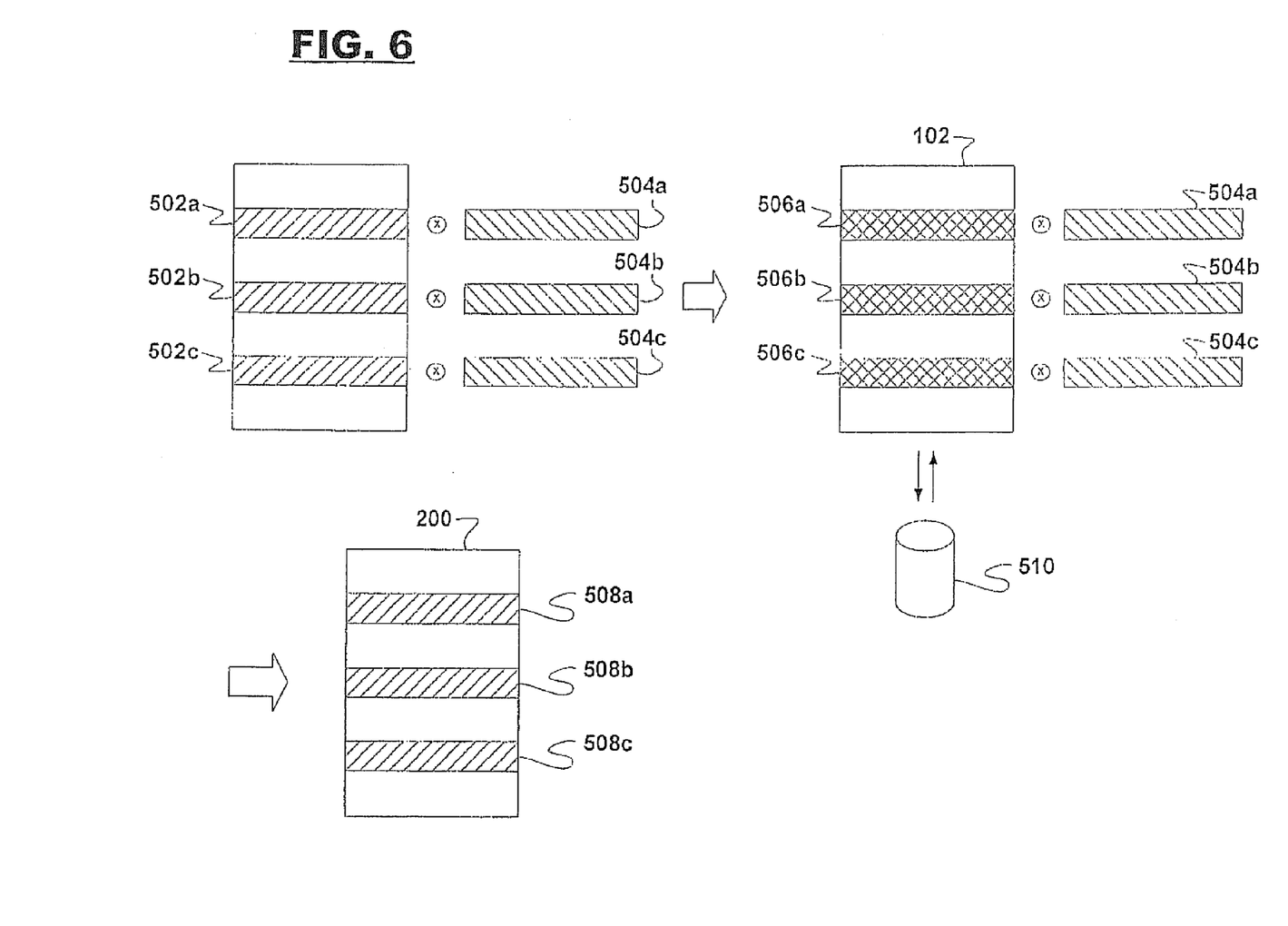
FIG. 6 shows an alternative embodiment of the present invention.

FIG. 6 shows an alternative scheme for operating on encrypted and/or hidden information, so that the information is not in unprotected memory in a plain text (or decrypted) form. This alternative scheme relies on the well-known principle that any sequence of information, when exclusively OR'ed ("XORed") twice, gives back the original sequence of information.

In FIG. 6, pages of proprietary information 502a, 502b and 502c are XORed with pages of random bits 504a, 504b and 504c. Pages of proprietary information 502a, 502b and 502c may be information for the same or different application (e.g., a software tool and/or peripheral device, etc.). Furthermore, pages of random bits 504a, 504b and 504c, which are generally different from each other, serve a purpose similar to the decryption key and/or hash in the above scheme, particularly in that the manufacturer, supplier and/or creator of the proprietary information must perform the first XOR operation to encrypt the proprietary information and must also provide the page of random bits for inclusion in or incorporation into the system/architecture 10. Also, each page of proprietary information 502x is generally associated with a unique page of random bits 504x.

The once-XORed, encrypted proprietary information 506a, 506b and/or 506c ("506x") may then be stored in unprotected memory 102 (preferably on disk 510), and there may be as many pages of encrypted proprietary information stored in unprotected memory 102 as may fit therein. A configuration table (similar to that shown in FIG. 4, but not shown in FIG. 6) may contain hashes (e.g., SHA-1 hashes) of the once-XORed pages 506a, 506b and/or 506c. Page(s) of random bits 504a, 504b and/or 504c ("504x") are generally stored in protected memory 104, and a pointer identifying the location of random bit pages 504a, 504b and/or 504c in protected memory 104 is generally stored in a corresponding field of the configuration table. In this embodiment, table 300 (at least initially) contains at least (1) a unique identifier for the page of proprietary information 506x and (2) a corresponding pointer to the location where the appropriate page of random bits 504x is stored.

A once-XORed, encrypted page 506x is decrypted by a subsequent XOR operation with the corresponding random bit page 504x to obtain decrypted proprietary information 508x (which is identical to the original proprietary information 502x). To avoid any need to store a plain text version of the encrypted page, the second XOR operation may be done on demand by XORing the encrypted bytes with the associated bytes located at the same offset within the page of random bits 504x corresponding to the current encrypted page 506x. This decryption operation occurs before (preferably as soon as possible before) execution of decrypted proprietary information 508x in private memory 200 and/or protected memory 104. Thus, pages of random bits 504x serve as a decryption tool, much like the hash or decryption key described above.

CONCLUSION/SUMMARY

Thus, the present invention provides a convenient, simple and efficient architecture, method and system for operating on hidden and/or encrypted information. If and/or when combined with an effective technique for preventing and/or inhibiting physical access to decrypted and/or hidden code (e.g., by removing a ROM, cache memory, or microprocessor IC from its board, removing the cap/top packaging materials, delayering the device, and using known reverse engineering techniques to determine the states of various memory bits/circuits thereon), one may completely prevent or effectively inhibit access to hidden code and/or plain text versions of encrypted code and/or data (which, as described herein, is kept hidden from software access by the present method, system and memory architecture).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A memory comprising:
   an unprotected memory portion operable to store encrypted information; and
   a protected memory portion operable to store an unencrypted form of said encrypted information, wherein said unencrypted form of said encrypted information is usable by an instruction if said instruction is at least one of predetermined instruction types stored in an encrypted form in said unprotected memory portion and if said instruction successfully passes an authorization procedure that uses a memory location of said encrypted form of said instruction in said unprotected memory portion.

2. The memory of claim 1, wherein said instruction is stored in said protected memory portion.

3. The memory of claim 1, further comprising an authorization key associated with said encrypted information, wherein said authorization key associated with said encrypted information is used by said authorization procedure.

4. The memory of claim 1, wherein said protected memory portion is further operable to store an authorization key associated with said encrypted information, and wherein said protected memory portion is further operable to store a pointer that points to a location of said unencrypted form of said encrypted information in said protected memory portion if said instruction successfully passes said authorization procedure.

5. The memory of claim 1, wherein said instruction is an operating system instruction.

6. The memory of claim 1, wherein said unencrypted form of said encrypted information is invisible to said unprotected memory portion, and wherein said unencrypted form of said encrypted information is further invisible to un-translated controlled processes.

7. The memory of claim 1, further comprising a page that is associated with said instruction in said unprotected memory portion, wherein said authorization procedure includes a comparison of a hash result with an expected hash result, and wherein said hash result represents a result of hashing at least a portion of said page.

8. A system comprising:
a processor; and
a memory comprising:
an unprotected memory portion configured to store encrypted information; and
a protected memory portion configured to store an unencrypted version of said encrypted information, wherein said processor is configured to execute an instruction to use said unencrypted version of said encrypted information if said instruction is at least one of predetermined instruction types stored in an encrypted form in said unprotected memory portion and if said instruction successfully passes an authorization procedure that uses a memory location of said encrypted form of said instruction in said unprotected memory portion.

9. The system of claim 8, wherein said instruction is stored in said protected memory portion.

10. The system of claim 8 further comprising an authorization key associated with said encrypted information, wherein said authorization key associated with said encrypted information is used by said authorization procedure.

11. The system of claim 8, wherein said protected memory portion is further operable to store an authorization key associated with said encrypted information, and wherein said protected memory portion is further operable to store a pointer that points to a location of said unencrypted version of said encrypted information in said protected memory portion if said instruction successfully passes said authorization procedure.

12. The system of claim 8, wherein said instruction is an operating system instruction.

13. The system of claim 8, wherein said unencrypted version of said encrypted information is invisible to said unprotected memory portion, and wherein said unencrypted version of said encrypted information is further invisible to un-translated controlled processes.

14. The system of claim 8, further comprising a page that is associated with said instruction in said unprotected memory portion, wherein said authorization procedure includes a comparison of a hash result with an expected hash result, and wherein said hash result represents a result of hashing at least a portion of said page.

15. A method comprising:
storing encrypted information in an unprotected memory portion; and
storing an unencrypted version of said encrypted information in a protected memory portion, wherein said unencrypted version of said encrypted information is usable by an instruction if said instruction is at least one of predetermined instruction types stored in an encrypted form in said unprotected memory portion and if said instruction successfully passes an authorization procedure that uses a memory location of said encrypted form of said instruction in said unprotected memory portion.

16. The method of claim 15 further comprising:
performing said authorization procedure on said instruction.

17. The method of claim 16, wherein said performing comprises:
hashing at least a portion of a page that is associated with said instruction in said unprotected memory portion; and
comparing a result of said hashing with an expected result, wherein said instruction successfully passes said authorization procedure if said result matches said expected result.

18. The method of claim 15 further comprising:
decrypting said encrypted information to form said unencrypted version of said encrypted information.

19. The method of claim 15, further comprising:
using an authorization key associated with said encrypted information in said authorization procedure.

20. The method of claim 15 further comprising:
pointing to a location of said unencrypted version of said encrypted information in said protected memory portion if said instruction successfully passes said authorization procedure.

* * * * *

UNITED STATES PATENT AND TRADEMARK OFFICE
CERTIFICATE OF CORRECTION

PATENT NO. : 8,335,930 B2
APPLICATION NO. : 12/567519
DATED : December 18, 2012
INVENTOR(S) : Johnson et al.

It is certified that error appears in the above-identified patent and that said Letters Patent is hereby corrected as shown below:

On the Title Page, in Column 1, delete Item "(76)" and insert Item -- (75) --, therefor.

Title Page 2, in Item (56), under "OTHER PUBLICATIONS", in Column 2, Line 37, delete "Firts-Year" and insert -- First-Year --, therefor.

Title Page 2, in Item (56), under "OTHER PUBLICATIONS", in Column 2, Line 52, delete "Authetication"," and insert -- Authentication", --, therefor.

Title Page 2, in Item (56), under "OTHER PUBLICATIONS", in Column 2, Line 59, delete "Non-Office" and insert -- Non-Final Office --, therefor.

Title Page 3, in Item (56), under "OTHER PUBLICATIONS", in Column 1, Line 1, delete "Non-Office" and insert -- Non-Final Office --, therefor.

Title Page 3, in Item (56), under "OTHER PUBLICATIONS", in Column 1, Line 2, delete "Non-Office" and insert -- Non-Final Office --, therefor.

Title Page 3, in Item (56), under "OTHER PUBLICATIONS", in Column 1, Line 3, delete "Non-Office" and insert -- Non-Final Office --, therefor.

Title Page 3, in Item (56), under "OTHER PUBLICATIONS", in Column 1, Line 4, delete "Non-Office" and insert -- Non-Final Office --, therefor.

Title Page 3, in Item (56), under "OTHER PUBLICATIONS", in Column 1, Line 5, delete "Non-Office" and insert -- Non-Final Office --, therefor.

Title Page 3, in Item (56), under "OTHER PUBLICATIONS", in Column 1, Line 8, delete "Non-Office" and insert -- Non-Final Office --, therefor.

Signed and Sealed this
Sixteenth Day of July, 2013

Teresa Stanek Rea
*Acting Director of the United States Patent and Trademark Office*

In the Specifications:

In Column 1, Line 9, delete "of copending" and insert -- of --, therefor.

In Column 1, Line 10, delete "879" and insert -- 879, filed dated Nov. 20, 2003, now Pat. No. 7,694,151 --, therefor.

In Column 1, Line 40, delete "reading" and insert -- reading, --, therefor.

In Column 1, Line 59, delete "algorithms" and insert -- algorithm(s) --, therefor.

In Column 5, Line 15, delete "and or" and insert -- and/or --, therefor.

In Column 5, Lines 59-60, delete "private memory 206" and insert -- private memory 200 --, therefor.

In Column 8, Line 38, delete "(i.e.;" and insert -- (i.e., --, therefor.

In Column 9, Line 15, delete "pace." and insert -- page. --, therefor.

In Column 9, Line 29, delete "pace" and insert -- page --, therefor.

In Column 9, Line 40, delete "(an" and insert -- (In --, therefor.

In Column 9, Lines 44-45, delete "addressees)" and insert -- address(es) --, therefor.

In Column 11, Line 31, delete "(e.g." and insert -- (e.g., --, therefor.